April 3, 1956  L. CRANDALL  2,740,386
ROTARY INTERNAL COMBUSTION ENGINE
Filed Aug. 16, 1952  3 Sheets-Sheet 1

LOID CRANDALL,
INVENTOR.

BY
ATTORNEY.

April 3, 1956          L. CRANDALL          2,740,386
ROTARY INTERNAL COMBUSTION ENGINE
Filed Aug. 16, 1952          3 Sheets-Sheet 2
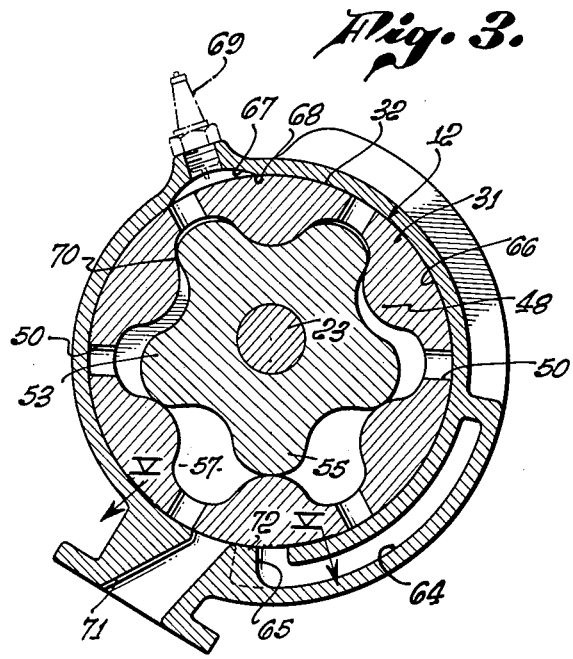
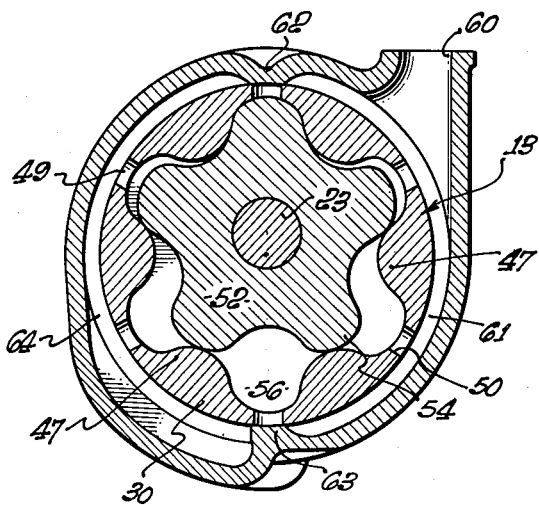
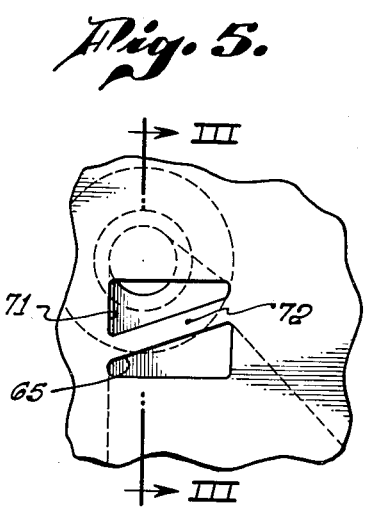
LOID CRANDALL,
INVENTOR.
BY
ATTORNEY.

April 3, 1956 — L. CRANDALL — 2,740,386
ROTARY INTERNAL COMBUSTION ENGINE
Filed Aug. 16, 1952 — 3 Sheets-Sheet 3

LLOID CRANDALL,
INVENTOR.

BY
ATTORNEY.

United States Patent Office 2,740,386
Patented Apr. 3, 1956

2,740,386

ROTARY INTERNAL COMBUSTION ENGINE

Loid Crandall, Alhambra, Calif.

Application August 16, 1952, Serial No. 304,809

14 Claims. (Cl. 123—12)

This invention relates to a rotary internal combustion engine and more particularly to improvements in the construction and arrangement of a stationary casing, outer rotor means, and inner rotor means for providing an efficient simply constructed rotary engine.

Prior proposed internal combustion engines contemplated utilizing the construction of fluid gear pumps with certain modifications to permit ignition of a fuel mixture compressed by the gear arrangement of said pumps. Such prior modifications resulted in a very complex construction when such a gear pump was adapted for use as an internal combustion engine. Lubrication became difficult, excessive leakage of fuel mixture occurred between the chambers formed by the gear teeth when enmeshed and the means for introducing and exhausting the fuel mixture included a complex arrangement of passageways. The rotary engine of this invention contemplates a design which obviates the complex construction of prior proposed rotary internal combustion engines.

Generally speaking, the rotary engine of this invention is characterized by outer rotor means comprising a pair of internally toothed annular gear members connected together by a radially inwardly extending partition wall or bulkhead for rotation together and for providing a precompression side or compartment and power side or compartment. Inner rotor means fixed to a driven shaft, which is eccentrically mounted with respect to the outer rotor means, may comprise a pair of externally toothed pinion drive members, each being cooperably associated with one of the annular members. The teeth of the outer and inner rotor means are configured for continuous engagement, are relatively movable, and define expanding and contracting chambers. The outer rotor means includes a plurality of slots between the teeth thereof, said slots having a preselected constant volumetric capacity in communication with the expanding and contracting chambers formed by the teeth. An outer casing journably supported on the shaft encloses said outer rotor means and provides in the walls thereof an inlet passageway to the precompression side, a passageway connecting the precompression side and the power side, and an exhaust passageway from the power side, such passageways being generally circumferentially arranged in said casing.

An object of this invention is to design and provide an internal combustion rotary engine simply and effectively constructed.

An object of this invention is to provide a rotary engine having a compression side and a power side arranged in tandem on a single shaft for effectively driving said shaft.

A further object of this invention is to design and provide a rotary engine having inner and outer rotor means and a casing enclosing said rotor means which is simply constructed and inexpensive to manufacture.

The invention contemplates a casing for enclosing the outer and inner rotor means provided with a plurality of circumferentially arranged passageways cooperable with the rotor means so as to properly introduce and exhaust a fuel mixture.

Still another object of this invention is to design and provide a rotary engine wherein relative movement between the outer and inner rotor means is relatively slow whereby wear between the rotor means is reduced to a minimum. Still another object of this invention is to design and provide a rotary engine provided with effective simple cooling means.

The invention further contemplates a modification wherein the passageways to and from the precompression side and power side of the engine are generally axially arranged and lie within the inner periphery of the stationary casing.

Other objects and advantages of this invention will be readily apparent in the description of the following drawings which exemplify a rotary engine embodying this invention.

In the drawings:

Fig. 3 is a sectional view taken in the transverse plane indicated by line III—III of Fig. 2.

Fig. 4 is a sectional view taken in the transverse plane indicated by line IV—IV of Fig. 2.

Fig. 5 is a fragmentary view taken from the curved plane indicated by line V—V of Fig. 3 to show the inner surface of the casing at the exhaust outlet.

Figure 1:
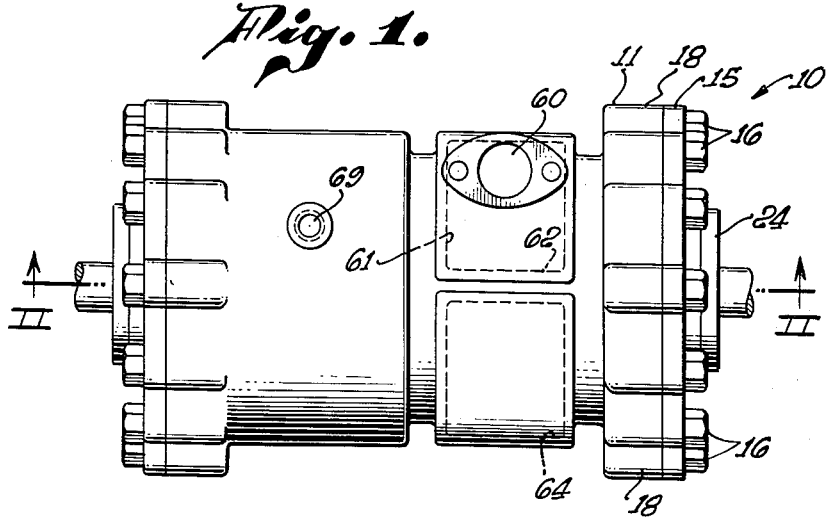
Fig. 1 is a top plan view of a rotary engine embodying this invention.

A rotary engine embodying this invention is generally indicated at 10 of Fig. 1 of the drawings and may include an outer stationary casing 11, an outer rotor means generally indicated at 12 rotatable within the casing, and an inner rotor means generally indicated at 13 cooperable with the outer rotor means as described in detail later.

The outer generally cylindrical elongated casing 11 may be provided with open ends 14. Each open end 14 may be covered by a closure member or plate 15 secured as by stud bolts 16 threadedly engaging bores 17 provided in a plurality of circumferentially spaced longitudinally extending thickened end sections 18. On its inner face, each closure plate 15 is provided with an annular marginal recess 19 providing an annular seat as at 20 for plate 15 against the adjacent outer annular edge portion of the casing. The opposite outer face of plate 15 may be provided with an inner axial recess 21 formed in an outwardly projecting boss 21a for accommodating suitable antifriction means, illustrated as a ball bearing assembly 22, for journably supporting a rotatable driven shaft 23. The bearing 22 may be retained by a bearing plate 24 secured to plate 15 by means of circumferentially spaced securing screws 25. The shaft 23 is eccentrically mounted with respect to the axis of the cylindrical casing 11.

Intermediate ends of the casing 11 and adjacent to its central portion may be integrally formed therewith a radially inwardly extending flange 26 normally delineating a precompression side of the engine and a power or driving side of the engine. The annular flange 26 may extend inwardly approximately half the radial distance between the outer casing wall and the drive shaft 23. In the example shown, the precompression side is slightly longer than the power side of the engine so as to provide a greater volumetric capacity on the precompression side. The differential between the capacity of the precompression and power side of the engine may be selectively varied as desired.

The inner wall surface of the casing 11 on the precompression side of the engine may be spaced radially inwardly of the inner wall surface on the power side for cooperation with the outer rotor means 12 as described hereinafter.

The outer rotor means 12 may comprise a pair of axially spaced annular gear members 30 and 31 mounted coaxially with the cylinder casing 11 and each having an outer, generally cylindrical surface in rotatable and sliding engagement as at 32 with the respective inner surfaces of casing on the precompression side and power side of the engine. Each annular gear member 30 and 31 may be provided with axially extending circumferential oppositely directed edge walls 33 and 34 respectively. The inner adjacent edge walls 33 and 34 may be suitably secured as by recessed bolts (not shown) to respective complementary annular portions 35 and 36 which together form an annular transversely disposed central partition or bulkhead 37. The portions 35 and 36 closely slidably embrace the radially inwardly extending flange 26. The portions 35 and 36 may be secured together by any suitable means such as recessed bolts (not shown) so that the annular members 30 and 31 are connected together for rotation as a unit by means of the portions 35 and 36. The transverse bulkhead 37 is provided with a central opening 38 coaxial with the casing 11.

The oppositely directed and outer edge walls 33 and 34 may be received respectively within annular marginal recesses 39 and 40 formed on the interior surfaces of inner closures 41 and 42 respectively and suitably secured thereto. The inner closures 41 and 42 may be suitably journaled as by ball bearing assemblies 43 upon inwardly extending hubs 44 and 45 of outer closure plates 15. Thus, it will be readily noted that the outer rotor means is rotatable within the cylindrical casing, is journably supported on the closure plates 15, and has an outer, generally cylindrical surface in close fitting slidable contact with the internal surfaces of the casing.

Figure 2:
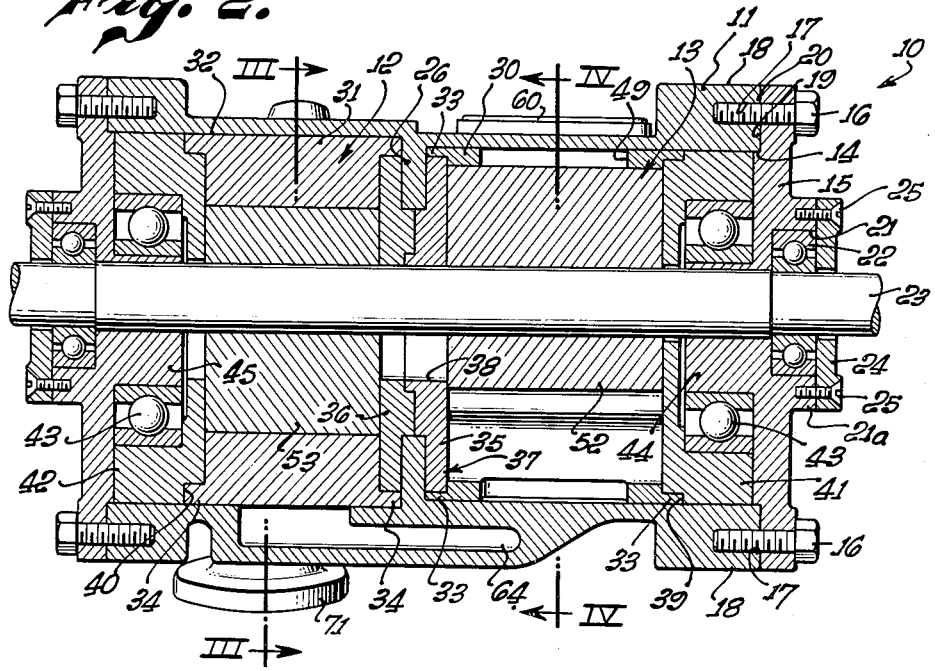
Fig. 2 is a longitudinal section taken along plane II—II of Fig. 1.

As best seen in Figs. 3 and 4, each annular gear member 30 and 31 is shown provided with a plurality of inwardly directed suitably configured teeth 47 and 48 respectively. Between said teeth at the root portion thereof are provided longitudinally extending slots 49 and 50 each of uniform width and depth. In Fig. 2 it will be seen that said slots 49 on the precompression side of the engine extend only partially across the annular member. Each slot 49 is of preselected dimension and provides a relatively shallow slot in depth as compared with a slot 50 on the annular gear member 31 on the power side of the engine. Thus the volumetric capacity of each slot 49 is relatively smaller than that of a slot 50 and affords a greater preselected compression ratio on the precompression side of the engine.

Each slot 50 in the annular gear member 31 is likewise of preselected dimensions and extends only partially across the gear member. The selected volumetric capacity of these slots 50 is correlated with selected precompression slots 49 so as to provide for a selected compression ratio on the power side of the engine.

It will also be noted from Figs. 3 and 4 that gear member 31 is angularly displaced from gear member 30 approximately one-half of the angle formed between adjacent teeth. When a slot 49 of member 30 is at top or bottom dead center (Fig. 4), a slot 50 of gear member 31 is angularly spaced from top or bottom dead center. It is understood such angular displacement of the two gear members may be selectively varied.

Within the outer rotor means 12 and cooperable therewith is the inner rotor means 13, said inner rotor means being mounted coaxially with the driven shaft 23 and secured thereto in any suitable well-known manner as by key means. The inner rotor means may comprise a pinion member 52 cooperable with the gear member 30 and a pinion drive member 53 cooperable with the gear member 31. Each of the pinion members 52 and 53 is formed with spaced external teeth 54 and 55 respectively which are one less in number than the number of internal teeth 47 and 48 and their configuration is such that a surface of each tooth of the pinion members is in continuous sliding contact with a surface of an adjacent tooth on the annular gear members. There is thus provided in the precompression side and in the power side of the engine a plurality of expandible and contractible chambers generally indicated at 56 and 57 respectively.

In Fig. 4, for example, two adjacent teeth 54 form with cooperable teeth 47 of the gear member 30 a chamber expanded to its maximum at the bottom dead center of the engine. As the two selected teeth are rotated on shaft 23 from this position, each tooth 54 gradually advances into chamber 56 for reducing the volumetric capacity thereof. At top dead center in Fig. 4, it will be noted that the variable portion of the chamber 56 has been reduced to a minimum and that a tooth 54 substantially completely occupies a chamber 56, and any substance carried in chamber 56 is compressed within the associated slot 49.

Each tooth 55 of the pinion drive member 53 cooperates with teeth 48 to provide expandible and contractible chambers 57 in a manner similar to that described above with respect to the members 30 and 52. The maximum and minimum capacity of chambers 57 are provided at bottom dead center and top dead center respectively as in the precompression side of the engine.

It will thus be readily apparent that as relative rotation occurs between the outer rotor means and the inner rotor means, a plurality of expanding and contracting chambers 56 and 57 are provided between the teeth of said rotor means.

The casing 11 may be provided with a plurality of circumferentially arranged passageways in order to provide flow of a premixed gaseous fuel mixture into the engine and between the precompression side and the power driven side thereof, and from the engine for discharge of exhaust products.

In Figs. 1 and 4, an intake port 60 is provided for admitting a premixed fuel mixture from a suitable source (not shown) to the engine. The intake port 60 communicates with a partially circumferential intake passageway 61 defined by the inner surface of the wall of casing 11 and the outer surface of gear member 30 of the outer rotor means on the precompression side of the engine. In the example shown, the intake passageway 61 may extend from a longitudinally and inwardly extending rib 62 located at approximately the top dead center of the casing to a longitudinally and inwardly extending rib 63 located at approximately the bottom dead center of the casing.

In operation, upon relative clockwise rotation (Fig. 4) of the pinion member 52 with respect to annular gear member 30 and while a fuel mixture is introduced through intake port 60, chambers 56 opposite to and in communication with passageway 61 are progressively expanding and act to suck or draw in the fuel mixture from the passageway.

Maximum expansion of each chamber 56 occurs approximately opposite bottom rib 63 and at that point it may be considered that chamber 56 is entirely filled with the fuel mixture.

Upon continued rotation past rib 63, each tooth 54 begins to advance into and between the teeth 48 and to contract chambers 56. Each successive contraction of a chamber 56 forces fuel mixture outwardly through slots 50 and into a partially circumferential and longitudinally spiraled duct or passageway 64 formed in the circumferential wall of casing 11. Substantially, all of the mixture sucked into chambers 56 on the intake side is ejected as each tooth 54 approaches the depending rib 62 at the top of the casing, because of the relatively shallow depth of slots 49, the only fuel mixture remaining being that in a respective slot 49. The mixture forced into duct 64 is further compressed during continuous rotation of the members 30 and 52, the amount of precompression depending upon the volumetric capacity of the precompression side of the engine and that of the power side of the engine.

Compressed fuel mixture accumulated in duct 64 is ejected through a discharge port 65 into a slot 50 and into an expanded chamber 57 when a slot 50 is rotated over discharge port 65. As the rotor means continue to rotate in a counterclockwise direction as viewed in Fig. 3, an associated tooth 55 commences to enter into chamber 57. Such continuous contraction of chamber 57 is provided by sliding contact of the annular gear member 31 along a continuous uninterrupted inner surface 66 provided between port 65 and an ignition chamber 67. The fuel mixture within each chamber 57 will thus be compressed into compression slot 50.

In Fig. 3 it will be readily apparent that maximum compression is reached at a point adjacent the top dead center of the engine. Immediately after a compression slot 50 passes point 68 which defines the leading edge of ignition chamber 67, a spark plug 69 may be energized by suitable well known timing means for igniting the compressed fuel mixture in a slot 50. The ignition chamber 67 may be a small bowl-shaped recess formed approximately above and at one side of the vertical center of the member 31 and may extend longitudinally over only a portion of a compression slot 50.

Upon ignition of the compressed mixture opposite ignition chamber 67, the explosive forces dveloped thereby act upon the pinion drive member 53 so as to urge an adjacent tooth 55 downwardly and in counterclockwise direction as viewed in Fig. 3. Such downward driving movement of a tooth 53 causes a leading portion of the surface of the tooth to bear against, as at 70, a trailing surface portion of a gear tooth 48. The forces exerted at 70 upon the gear tooth 48 thus drives the driven shaft 23 and causes relative rotative movement between the outer rotor means and the inner rotor means whereby the outer rotor means is caused to rotate.

Further rotation of the pinion drive member 53 after the beginning of the power stroke expands the associated chamber 57 and before reaching the bottom dead center of the device, the expanding exploded gases are discharged from chamber 57 by means of the slot 50 rotating and passing over an exhaust outlet 71. The exposure of the expanding chamber 57 to atmospheric pressure causes a sudden outrush of exhaust gases.

The chamber 57 is completely and thoroughly scavenged of exhaust gases by the particular construction of the exhaust outlet and port 65 which admits fuel into a chamber 57. As best seen in Fig. 5, as a slot 50 passes over the opening to the exhaust outlet 71, the diagonally arranged rib 72 forming a partition wall between the discharge port 65 and the exhaust outlet 71 permits a small portion of the compressed fuel mixture to escape through the port 65 into the chamber 57 while the chamber 57 is in communication with the exhaust outlet 71. Thus, the sudden outrush of exhaust gases due to differences in pressure between the atmospheric and the exhaust pressures within the chamber 57 is followed by introduction of a small amount of fuel mixture under pressure to thoroughly scavenge chamber 57 of exhaust products.

As the slot 50 passes over the rib 72, compressed fuel mixture from chamber 64 is drawn and forced into compression chamber 57 because chamber 57 is at substantially atmospheric pressure.

As illustrated, the compression stroke in the engine on the power side, as measured in degrees, may be approximately 180°. The length of the compression stroke may be varied in correlation with a selected power stroke depending upon the particular power characteristics desired. The variance in the length of power stroke may be between 150° and 180°. Any extension of the power stroke may be compensated for by increasing the capacity of the precompression side of the engine.

The exhaust outlet 71 may be suitably flanged for connection to a suitable exhaust manifold (not shown) for discharge of the exhaust gases.

Because of the meshed interengagement of the pinion members 52 and 53 with the annular gear members 30 and 31, the outer rotor means is also rotatably driven but at a slightly slower rate of speed because of the difference in the number of teeth between the inner and outer rotor means. As the revolutions of the shaft and the outer rotor means increase, the inertia of the outer rotor means tends to act as a flywheel.

It is contemplated that the fuel mixture include lubricating ingredients so that the meshed engagement of the outer and inner rotor means will be lubricated. Such self-lubrication will provide a thin lubricating film on the cooperative surfaces of the annular members and the pinion.

In the modification shown in Figs. 6–9 inclusive, a rotary-type engine embodying this invention differs from the prior described embodiment in the structure of the casing, in the manner of forming passageways for conducting fuel mixture to and from the precompression side of the engine and the power side of the engine, and in the manner of introducing fuel mixture to the precompression side of the engine. In this embodiment, the passageways for conducting fuel mixture are generally formed within the casing and are not in external circumferential relationship thereto.

Figure 6:
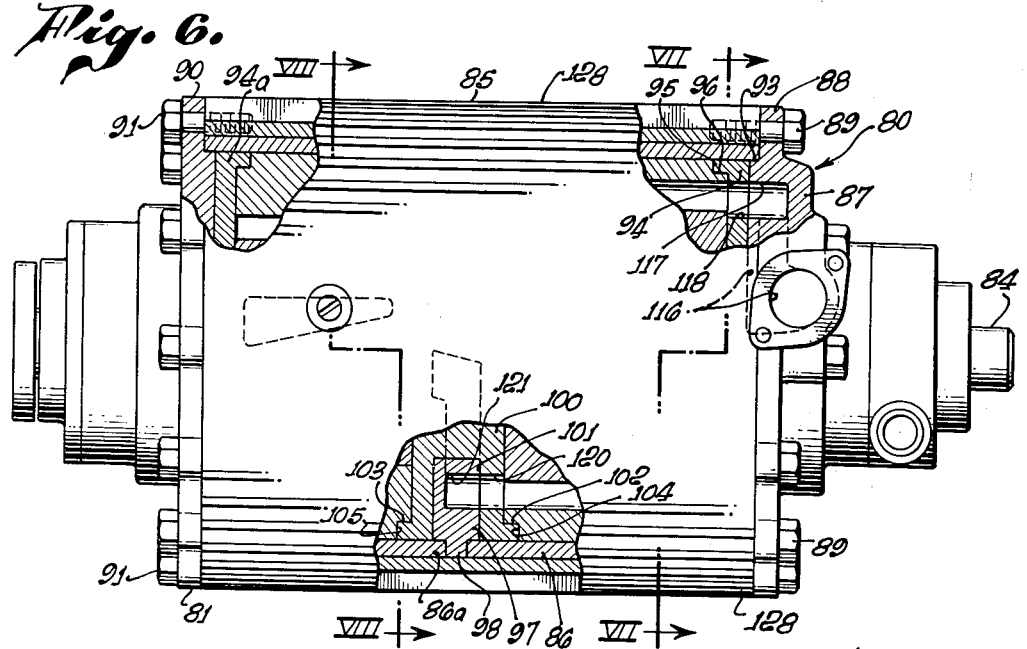
Fig. 6 is a top view of a different modification of a rotary-type engine embodying this invention, fragmentary portions of the cover being broken away to show certain details in section.

In Fig. 6 a rotary-type engine, generally indicated at 80, may include an outer stationary housing 81, an outer rotor means 82 and an inner rotor means 83 carried by a driven shaft 84 extending along an axis eccentric to the axis of the housing 81.

The housing 81 may comprise an open-ended hollow cylindrical wall 85 provided with internal, hollow, open-ended sleeve members or liners 86 and 86a. The inlet end of housing 81 may be closed by an end closure plate 87 having an annular flange 88 secured as by circumferentially spaced bolts 89 to the cylindrical wall 85. The end plate 87 is preferably formed from a casting and may carry anti-friction means (not shown) to rotatably carry the driven shaft 84 as in the previous embodiment. An end closure plate 90 provided at the opposite end of housing 81 may be secured to the cylindrical wall 85 by a circumferential flange and a plurality of circumferentially spaced bolts 91. End closure plate 90 also carries anti-friction means for journably supporting shaft 84 as in the previous embodiment.

The end closure plate 87 may be provided with an internal annular shoulder 93 accommodated within the sleeve liner 86. Inwardly of shoulder 93 may be provided an inner closure plate 94 having an inwardly facing circumferential rib 95 adapted to be received with an outwardly facing annular recess 96 formed in the circumferential margin of the outer rotor means 82.

The opposite end of the housing 81 is likewise provided with an inner closure plate 94a similar to 94, but nonported, and cooperative with the outer rotor means so as to not only close the open outer end of sleeve lines 86a but to position the adjacent outer rotor means.

Means for defining a precompression side and a power side of the engine may be provided by a centrally positioned, radially inwardly extending annular flange 97, said flange having an outwardly extending, central circumferential rib 98. The rib 98 may be positioned between precompression and power sleeve liners 86 and 86a so that flange 97 is accurately positioned in the housing when outer closure plates 87 and 90 are properly secured.

Encompassing flange 97 may be an annular U-section member 100 having a circumferential, outwardly facing groove 101 adapted to receive flange 97 therewithin. The member 100 includes oppositely directed, axially extending outer circumferential ribs 102 and 103 adapted to be accommodated within corresponding recesses 104 and 105 formed in inboard circumferential margins of the outer rotor means 82.

The outer rotor means 82 is generally similar to the outer rotor means described in the previous embodiment and may comprise interconnected, annular internally toothed, axially spaced gear members 107 and 108. The gear members 107 and 108 are interconnected for rotation together by the annular member 100. Each gear member 107 and 108 is also interconnected to the inner closure plates as in the previous embodiment so that gear members 107 and 108 may rotate as a unit with respect to shaft 84.

Gear member 108 is provided with axially extending slots 110, serving as compression chambers of predetermined selected volumetric capacity. Gear member 107, in this exemplary illustration, is not provided with slots extending from the root of the teeth outwardly to the outer face thereof.

The eccentrically mounted inner rotor means 83 includes a pinion precompression gear 112 and a pinion drive gear 113, each having externally arranged teeth adapted to be in continuous contact with respective internal teeth of the annular gear members 107 and 108 as described in the previous modification. The number of teeth on pinion gears 112 and 113 may be one less than the number of teeth on gear members 107 and 108. The pinion gears 112 and 113 may be fixed to shaft 84 by well-known key means.

As in the previous modification, the teeth of pinion gear 112 may be angularly offset with relation to the teeth of the pinion drive gear 113. The enmeshment of the teeth of the pinion gears 112 and 113 with the gear members 107 and 108 respectively, forms expandable and contractible chambers 114 and 115 between said teeth.

In this modification, the means for introducing and conducting a premixed fuel mixture through the rotary engine differs from the previous modification and may include a fuel mixture inlet port 116 provided in the outer closure plate 87 and to which a fuel mixture inlet supply line (not shown) may be connected in well-known manner. The inlet port 116 leads to a generally semicircular manifold passageway 117 formed in inner face of outer closure plate 87. The radial position of manifold passageway 117 corresponds generally with the radial outward portion of the expandible and contractible chambers 114. The manifold passageway 117 communicates with chambers 114 by means of a plurality of spaced ports 118 provided in the inner closure plate 94, each port 118 being aligned with an opposite chamber 114. Thus, on the precompression side of the engine, fuel mixture may be introduced to precompression chambers 114 as they are expanding during rotation so that fuel mixture will be positively drawn into said chambers. A chamber 114 may be expanded to maximum capacity adjacent to bottom dead center of the engine and adjacent to the termination of manifold passageway 117 as shown at 119.

As expanded chamber 114 further rotates (counterclockwise as viewed in Fig. 7) each chamber is closed at its outboard end by the wall of outer closure 87 diametrically opposite to manifold passageway 117. The fuel mixture is compressed by contraction of each chamber 114 in its rotation towards top dead center position, and is ejected into an aligned associated outlet port 120 formed in annular member 100. Outlet port 120, when disposed in the compression portion of the precompression cycle leads to an approximately semicircularly arranged passageway 121 provided in central flange 97, said passageway 121 terminating adjacent to bottom dead center as best seen at 122, Fig. 9. Passageway 121 provides for flow of precompressed fuel mixture from the precompression side of the engine to the power side of the engine.

Figures 7, 8:
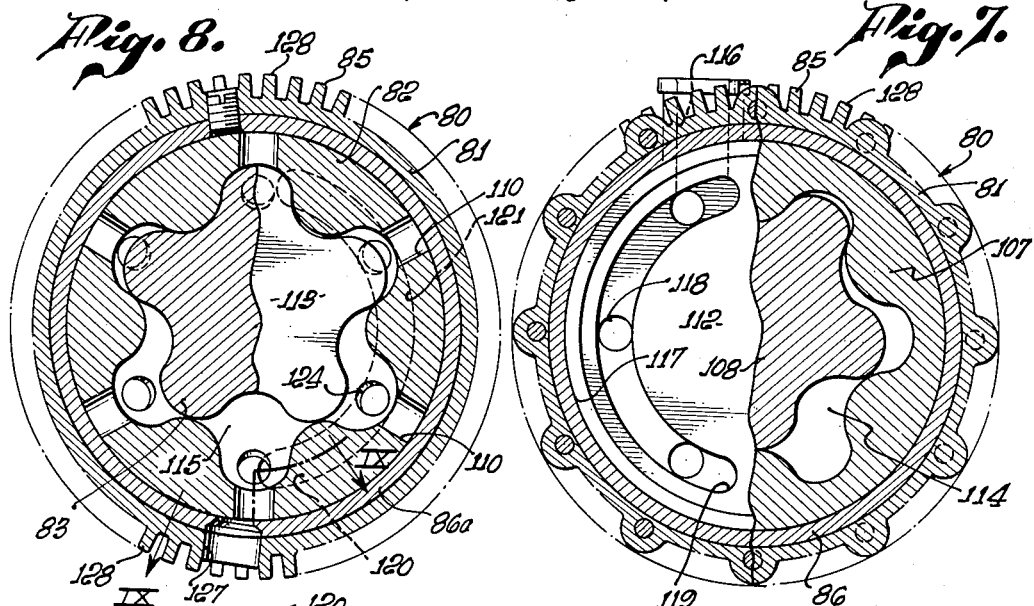
Fig. 7 is a transverse sectional view taken in the plane indicated by line VII—VII of Fig. 6.
Fig. 8 is a transverse sectional view taken in the planes indicated by line VIII—VIII of Fig. 6.
Figure 9:
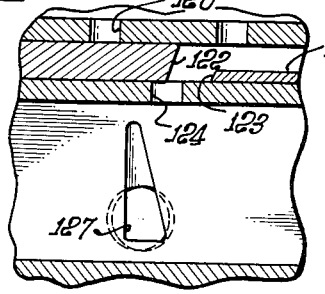
Fig. 9 is a fragmentary sectional view taken in the curved planes indicated by lines IX—IX of Fig. 8.

As best seen in Figs. 8 and 9, fuel compressed in passageway 121 is ejected through a discharge port 123 and through ports 124 formed in member 100 into aligned chambers 115 of annular gear member 108. It may be noted that ports 120 and 124 are offset (Fig. 9), an arrangement resulting from the angular displacement of the respective gear means in the precompression and power side of the engine. The injection of precompressed fuel mixture into the chambers 115 on the power side of the engine occurs at approximately the bottom dead center of the engine and at a point in the cycle of the annular gear member 108 and the pinion drive member 113 when the chamber 115 is in maximum expanded position. As the rotor means continue to rotate, the chambers 115 are contracted and fuel mixture therein is compressed into the slots 110, maximum compression occurring at approximately top dead center of the engine. Slightly beyond top dead center of the engine, the compressed fuel mixture may be ignited and exploded by suitable ignition means carried in the housing 81 by a threaded opening 126 formed slightly off center in the top of the housing 81. The ignition means may comprise any suitable spark plug which may be associated with timing means if desired. However, it is understood that timing means are not necessary in the operation of an engine embodying this invention.

When the compressed fuel mixture is exploded by the ignition means, the explosive forces developed thereby act against the teeth of the pinion drive gear 113 as described in the prior embodiment, causing the pinion drive gear 113 to rotate and thus driving the driven shaft 84 and also causing rotation of the outer rotor means. As each chamber 115 rotates downwardly, it is expanded, and when it reaches a position at approximately the bottom dead center of the engine, exhaust products of combustions are expelled through a generally triangular shaped exhaust outlet 127 formed in the cylindrical wall 85 and sleeve 86a.

Scavenging of virtually all exhaust products for each chamber 115 is accomplished in a manner similar to the prior embodiment by slightly overlapping outlet port 123 with the exhaust port 127. Thus, as a chamber 115 passes between the exhaust port 127 and the outlet port 123, a small quantity of precompressed fuel mixture is admitted to the chamber through port 124 under pressure for scavenging the exhaust products therefrom. To facilitate the scavenging operation, the ports 124 in member 100 may be slightly upwardly directed so as to purge exhaust products retained in the upper portion of each chamber 115.

Longitudinally extending cooling fins 128 may be provided on the cylindrical wall 85 of the housing.

While the length (in degrees) of the compression and power strokes of the engine have been illustrated at approximately 180°, it is understood that the power stroke may be varied, as between 150° and 180°, and the compression stroke correlated thereto. Likewise, the relative capacities of displacements of the power side and of the precompression side may be readily varied to obtain a rotary engine of desired characteristics. The simple effective arrangement of the passageways affords a means for flow of a fuel mixture which is positive and requires a minimum of maintenance.

The ignition means may be continuous or may be energized by a timing means. The ignition means may be operative in an ignition chamber as in the prior described embodiment, although it is understood that any means whereby the compressed fuel mixture may be exploded may be employed.

This invention contemplates that the number of teeth provided on the outer and inner rotor means may be varied and that the slots 49 and 50 may likewise be varied in their dimensions so as to provide selected compression ratios both on the precompression side of the engine and on the power side of the engine.

The tandem arrangement of the precompression side of the engine and the power side of the engine together with the particular arrangement of passageways and ducts for flow of a fuel mixture to the precompression side, between the precompression side and the power side, and from the power side provides a simple, effective and efficient arrangement of a rotary internal combustion engine.

Various other changes and modifications may be made in the embodiment of the rotary engine described and all such changes and modifications coming within the scope of the appended claims are embraced thereby.

I claim:

1. In a rotary engine, the combination of: an outer stationary generally cylindrical casing; a driven shaft eccentrically and journably supported by the casing, an internal radially inwardly extending flange on said casing intermediate the ends thereof; outer rotor means journably supported from said casing and comprising, a pair of annular internally toothed members, a transverse bulkhead embracing the internal flange on the casing and connecting said annular members for rotation together, said annular members being connected with the teeth of one member angularly displaced with respect to the teeth of the other member, said transverse bulkhead defining a precompression portion and a power portion of the casing; inner rotor means fixed to said shaft and comprising a pair of externally toothed pinion members, the number of teeth of said pinion members being one less than the number of teeth on said outer rotor means, the teeth on said outer rotor means and said inner rotor means being configured so as to provide continuous sliding contact therebetween to afford expanding and contractible chambers therebetween, each of said annular members having a plurality of longitudinally extending slots formed therein between their teeth and extending to the inner surface of the outer casing; an inlet passageway in said casing communicating with a portion of said precompression chamber, a passageway in said casing extending between said precompression chamber and said power chamber, and a discharge outlet from said power chamber; and means carried by said casing and associated with said power chamber for igniting a combustible mixture in said power chamber adjacent to a point of maximum compression.

2. In a rotary engine, the combination of: an outer stationary generally cylindrical casing; a driven shaft eccentrically and journably supported by the casing, an internal radially inwardly extending flange on said casing intermediate the ends thereof; outer rotor means journably supported from said casing and comprising, a pair of annular internally toothed members, a transverse bulkhead embracing the internal flange on the casing and connecting said annular members for rotation together, said annular members being connected with the teeth of one member angularly displaced with respect to the teeth of the other member, said transverse bulkhead defining a precompression portion and a power portion of the casing; inner rotor means fixed to said shaft and comprising a pair of externally toothed pinion members, the teeth on said outer rotor means and said inner rotor means being configured so as to provide continuous sliding contact therebetween to afford expanding and contractible chambers therebetween, each of said annular members having a plurality of longitudinally extending slots formed therein between their teeth and extending to the inner surface of the outer casing; an inlet passageway in said casing communicating with a portion of said precompression chamber, a passageway in said casing extending between said precompression chamber and said power chamber, and a discharge outlet from said power chamber, and means carried by said casing and associated with said power chamber for igniting a combustible mixture in said power chamber adjacent to a point of maximum compression.

3. In a rotary engine, the combination of: an outer stationary generally cylindical casing; a driven shaft eccentrically and journably supported by the casing; an internal radially inwardly extending flange on said casing intermediate the ends thereof; outer rotor means journably supported from said casing and comprising, a pair of annular internally toothed members, a transverse bulkhead embracing the internal flange on the casing and connecting said annular members for rotation together, said transverse bulkhead defining a precompression portion and a power portion of the casing; inner rotor means fixed to said shaft and comprising a pair of externally toothed pinion members, the teeth on said outer rotor means and said inner rotor means being configured so as to provide continuous sliding contact therebetween to afford expanding and contractible chambers therebetween, each of said annular members having a plurality of longitudinally extending slots formed therein between their teeth and extending to the inner surface of the outer casing; an inlet passageway in said casing communicating with a portion of said precompression chamber, a passageway in said casing extending between said precompression chamber and said power chamber, and a discharge outlet from said power chamber; and means carried by said casing and associated with said power chamber for igniting a combustible mixture in said power chamber adjacent to a point of maximum compression.

4. In a rotary engine, the combination of: an outer stationary generally cylindrical casing, a driven shaft eccentrically and journably supported by the casing; an internal radially inwardly extending flange on said casing intermediate the ends thereof; outer rotor means journably supported from said casing and comprising a pair of annular internally toothed members; inner rotor means fixed to said shaft and comprising a pair of externally toothed pinion members; the teeth on said outer rotor means and said inner rotor means being configured so as to provide continuous sliding contact therebetween to afford expanding and contractible chambers therebetween, each of said annular members having a plurality of longitudinally extending slots formed therein between their teeth and extending to the inner surface of the outer casing; an inlet passageway in said casing communicating with a portion of said precompression chamber, a passageway in said casing extending between said precompression chamber and said power chamber, and a discharge outlet from said power chamber; and ignition means carried by said casing.

5. In an internal combustion rotary engine, the combination of: means forming an outer casing having axially spaced chambers, each with an internal cylindrical surface therein; outer rotor means coaxial with said casing and having interconnected spaced internally toothed annular members with outer cylindrical surfaces cooperative with said internal surfaces; inner rotor means including pinion members having external teeth cooperative with said outer rotor means and relatively rotatable with respect thereto; a driven shaft connected to said inner rotor means and eccentrically mounted with respect to said casing, said outer rotor means being journably supported from said casing; and passageway means formed in said casing for introducing a combustible mixture to one chamber, for flow of said mixture between said chambers, and for discharging combustion products of said mixtures from the other chamber.

6. An engine as claimed in claim 5 wherein said passageway means in said casing include circumferentially arranged passageways.

7. An engine as claimed in claim 5 wherein each annular member is provided with means affording communication between said passageway means and the interior of said annular members.

8. In an internal combustion rotary engine, the combination of: an outer hollow stationary casing provided with axially spaced precompression and power chambers defined by a radially inwardly extending flange intermediate ends of said casing; a driven shaft extending through said casing in eccentric relation to the axis of said casing; an outer closure plate at each end journably mounting said shaft from said casing; an inner closure plate at each end journably mounted on said outer plate; an outer rotatable rotor means coaxial with said casing and including interconnected, spaced, internally toothed annular gear members, each associated with a chamber, said interconnected gear members being connected to said inner closure plates for rotation about said driven shaft; inner rotatable rotor means including a pinion gear member in each chamber having external teeth cooperative with the associated gear member, the external and internal teeth of said pinion gear members and said annular gear members, respectively, having surfaces in continuous contact and forming expandible and contractible compression chambers; an intake port in one outer closure plate; means forming a manifold passageway in the adjacent inner closure plate for communication between said intake port and the precompression chamber; a single semi-circular passageway means formed in the flange and having an inlet to the precompression chamber and an outlet to the power chamber for flow of precompressed fuel mixture between the precompression and power chambers; means carried in the casing for igniting a compressed mixture in said power chamber; and means formed in said casing for exhausting products of combustion from the power chamber.

9. A claim as defined in claim 8, wherein said outlet for the passageway means in the flange is in partial overlapping relation with the exhaust means.

10. In an internal combustion rotary engine, the combination of: an outer hollow stationary casing provided with axially spaced precompression and power chambers defined by a radially inwardly extending flange intermediate ends of said casing; a driven shaft extending through said casing in eccentric relation to the axis of said casing; an outer closure plate at each end journably mounting said shaft from said casing; an inner closure plate at each end journably mounted on said outer plate; an outer rotor means coaxial with said casing and including interconnected, spaced, internally toothed annular gear members, each associated with a chamber, said interconnected gear members being connected to said inner closure plates for rotation about said driven shaft; inner rotor means including a pinion gear member in each chamber having external teeth cooperative with the associated gear member, the external and internal teeth of said pinion gear members and said annular gear members, respectively, having surfaces in continuous contact and forming expandible and contractible compression chambers; an intake port at one end of said casing; a manifold means at said one end for flow of a fuel mixture from said intake port to said precompression chamber; a single passageway means in said casing between the precompression and power chambers; ignition means for the power chamber; and exhaust passageway means at the other end of the casing for discharging exhaust products from the power chamber.

11. In a rotary power device, the combination of: a stationary housing provided with axially spaced precompression and power chambers, each chamber having internal cylindrical surfaces, outer rotatable rotor means coaxial with said housing and having interconnected, axially spaced, internally toothed annular gear members rotatable as a unit within said spaced chambers, said gear members being provided with outer cylindrical surfaces cooperative with said internal surfaces and having slots of predetermined volume between teeth of said annular gear members; inner rotatable rotor means including pinion gear members having external teeth cooperative with the internal teeth of said annular gear members and relatively rotatable with respect thereto and in continuous sliding contact therewith to form expandible and contractible gear chambers; a driven shaft interconnecting the pinion gear members and eccentrically mounted in said housing; means in said housing for introducing a fuel mixture into the gear chambers in the precompression chamber; means in said stationary housing forming a passageway for flow of precompressed fuel from said slots in the gear member in said precompression chamber and to gear chambers in said power chamber; and means in said housing opposite the power chamber for exhausting fuel combustion products therefrom.

12. In a rotary power device, the combination of: a stationary housing providing axially spaced precompression and power compartments and having end closure means, each compartment having an internal cylindrical surface; outer rotatable rotor means coaxial with said housing and having an internally toothed annular gear member in each chamber with an outer cylindrical surface cooperative with said internal surface, said gear members being interconnected and journaled in said end closure means; inner rotatably driven rotor means including a pinion member in each chamber having external teeth cooperative with said internally toothed annular member to form expandible and contractible gear chambers; a driven shaft interconnecting said pinion members and eccentrically mounted in said end closure means; said annular members of the outer rotor means each having predetermined compression chambers extending from the outer cylindrical surface thereof to adjacent gear chambers; means in one end closure means forming an inlet port and a manifold passageway in communication with gear chambers in the precompression compartment; means in said housing forming a single passageway from the gear chambers in the precompression compartment to gear chambers in the power compartment; and means in said housing opposite said power compartment for exhaust of combustion fuel products.

13. A device as claimed in claim 12 wherein the passageway means between the compartments includes a discharge outlet and the exhaust means includes an exhaust port, said discharge outlet and said exhaust port being positioned in overlapping angularly displaced relation whereby precompressed fuel may enter a gear chamber from which exhaust combustion products are being discharged for scavenging said products therefrom.

14. In an internal combustion rotary engine, the combination of: an outer rotatable internally toothed rotor means; an inner externally toothed rotor means rotatable about an axis eccentric to the axis of said outer rotor means; a driven shaft connected to said inner rotor means; an outer stationary casing enclosing said outer rotor means and provided with axially spaced chambers, said outer and inner rotor means being operable in said chambers and including axially spaced cooperable outer and inner rotor members intermeshed and defining compression chambers; a passageway means in said casing to introduce a combustible mixture to one chamber; a single passageway means of semi-circular form in said stationary casing extending between said axially spaced chambers and cooperable with said compression chambers for flow of mixture between said axially spaced chambers; and passageway means for discharging combustion products of said mixture from one of said chambers.

References Cited in the file of this patent

UNITED STATES PATENTS

| | | |
|---|---|---|
| 892,295 | Nutz | June 30, 1908 |
| 2,189,976 | Lavaud | Feb. 13, 1940 |